Oct. 30, 1956          J. A. MAUL          2,768,629

MOISTURE MEASURING METHOD AND APPARATUS

Filed Sept. 24, 1953          4 Sheets-Sheet 2

INVENTOR
JOHN A. MAUL
BY
ATTORNEY

Oct. 30, 1956  J. A. MAUL  2,768,629
MOISTURE MEASURING METHOD AND APPARATUS
Filed Sept. 24, 1953  4 Sheets-Sheet 3
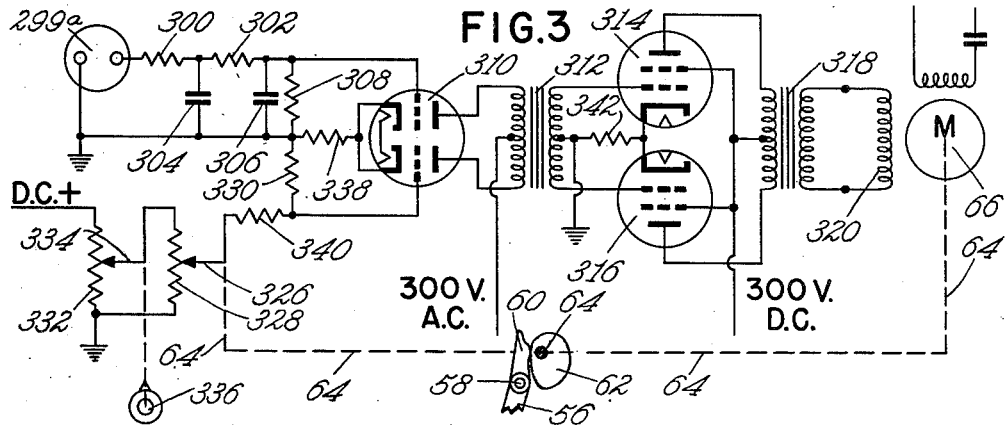
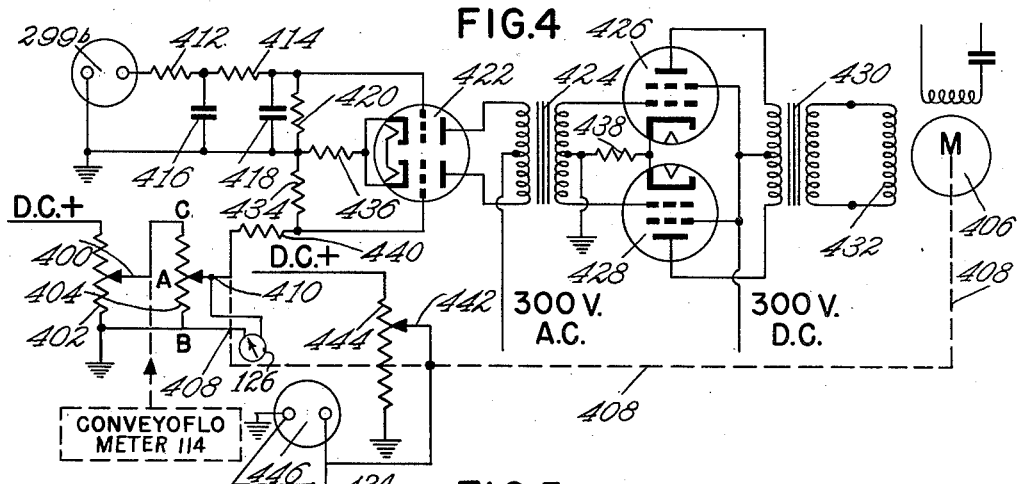
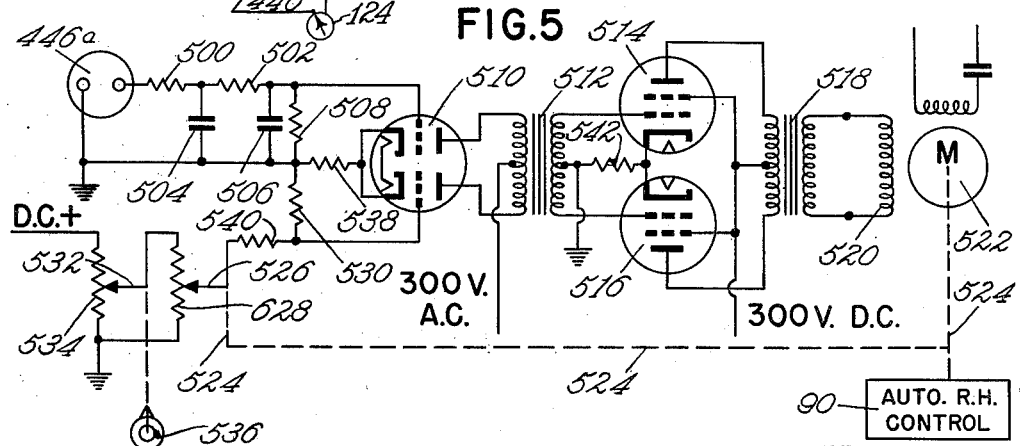
INVENTOR
JOHN A. MAUL
BY
ATTORNEY

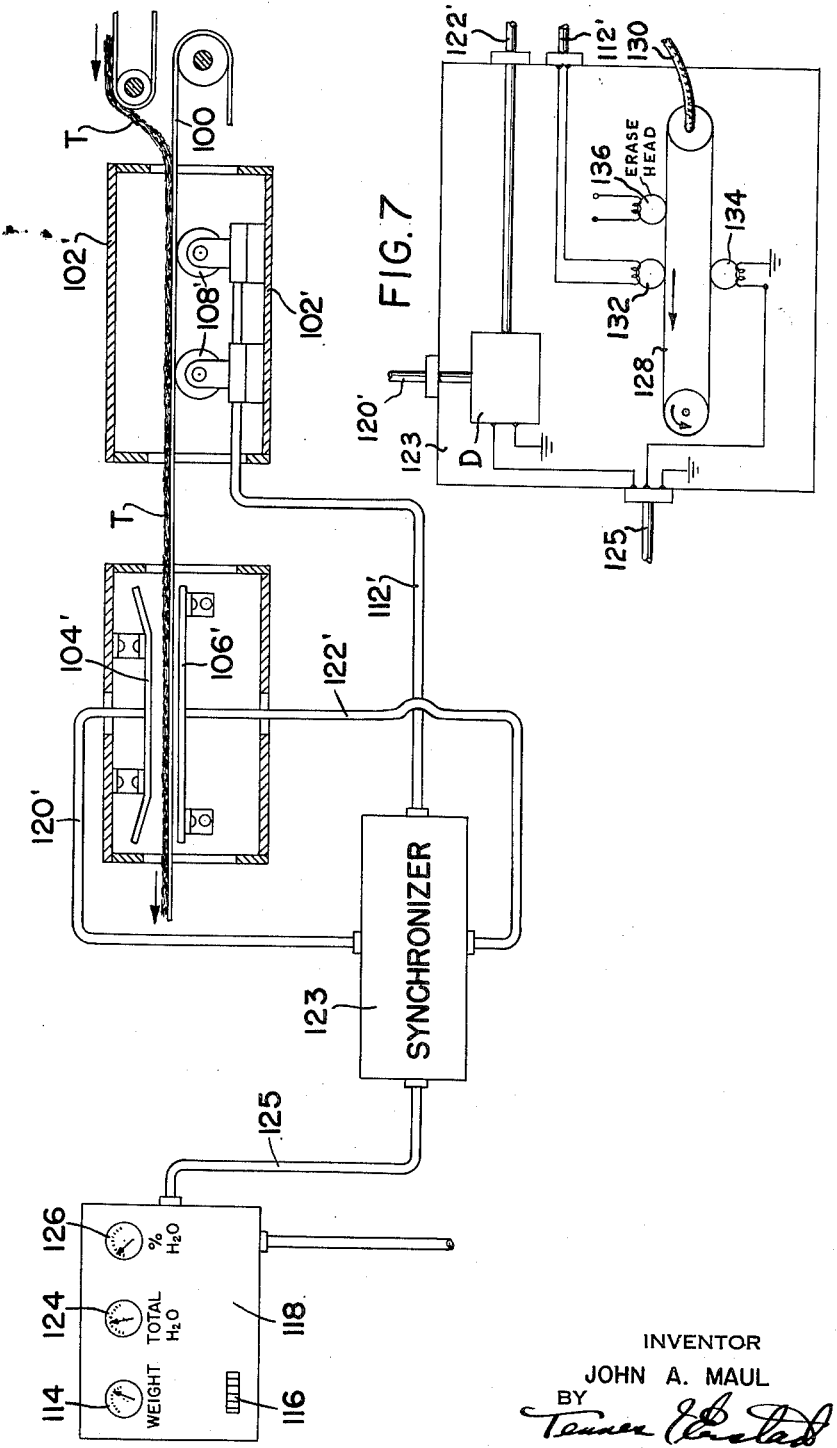

United States Patent Office 2,768,629
Patented Oct. 30, 1956

2,768,629

MOISTURE MEASURING METHOD AND APPARATUS

John Andrew Maul, Athens, Ohio, assignor to American Machine and Foundry Co., a corporation of New Jersey Application September 24, 1953, Serial No. 382,126

10 Claims. (Cl. 131—135)

This invention relates to moisture measuring and controlling methods and apparatus and particularly to a method and apparatus for measuring and controlling the percent of moisture in tobacco.

One of the problems of processing tobacco consists of the measurement and control of moisture. As far as known, the present methods and apparatuses employed for this purpose do not lend themselves to continuous processes.

It is therefore an object of this invention to provide an apparatus and method which is adaptable to be used to continuously determine the percent of moisture in the tobacco.

Another object is to provide an apparatus which will be sensitive to the moisture in the tobacco and which will automatically take into account the mass of the tobacco when measuring the percent of moisture in the tobacco.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 3 is a servo amplifier circuit working in conjunction with the dielectric detector shown in Fig. 2 and employed for the purpose of effecting the proper setting of a tobacco predryer damper control.

Fig. 4 is a combined potentiometer and servo amplifier circuit working in conjunction with a dielectric detector shown in Fig. 2 for dividing the total water indication signal by the total weight indication to effect a computation of the percent of moisture.

Fig. 5 is a servo amplifier circuit employed for the purpose of effecting the proper regulation and setting of the automatic relative humidity control of the tobacco dryer.

Fig. 6 is a modification of the invention.

Fig. 7 is a diagrammatic detail view of the synchronizer of Fig. 6.

Figure 1:
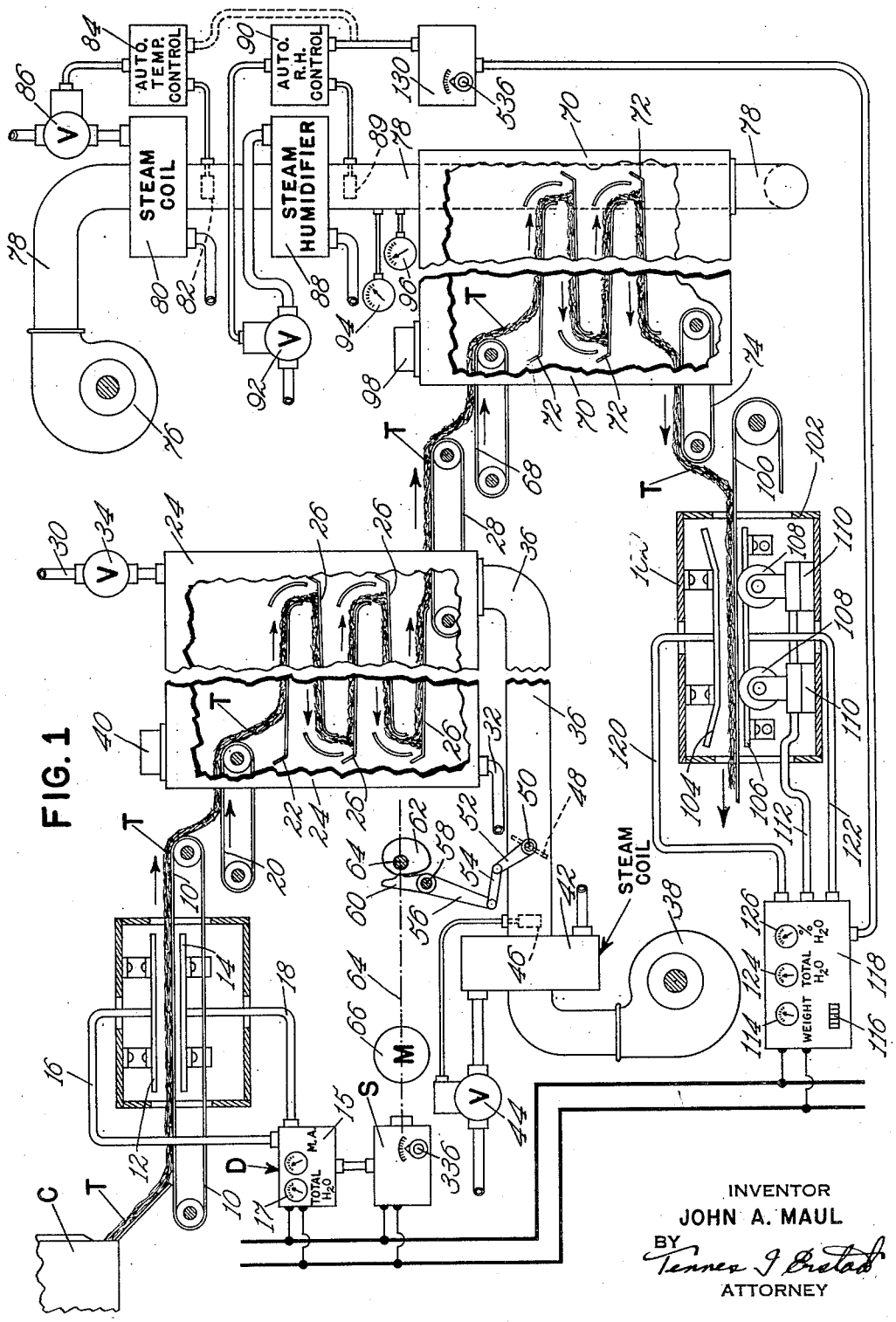
Fig. 1 is a schematic representation of a moisture measuring and tobacco drying apparatus.

Referring to Fig. 1, a continuous stream of shredded tobacco T is delivered from a suitable source such as a conventional tobacco cutter C onto a continuously moving endless belt conveyor 10. The conveyor 10 carries the tobacco stream T between and past a pair of plate-formed electrodes 12 and 14 which are suitably mounted adjacent to a top and bottom portion of the upper run of said conveyor belt 10.

The electrodes 12 and 14, by means of shielded conduits 16 and 18, are connected to a suitable dielectric detector D, which may be of the type disclosed in U. S. patent application of William C. Broekhuysen and Vincent J. Petrucelli, Serial No. 148,662, filed March 9, 1950, now Patent No. 2,729,214, issued January 3, 1956, enclosed in a box 15 the circuit of which will be described hereinafter. After passing through the electrodes 12 and 14 the tobacco stream T is delivered by the conveyor 10 onto an intermediate continuously running endless conveyor belt 20, which in turn deposits said tobacco stream onto a slightly inclined vibrator plate 22 suitably mounted and operated within a tobacco predryer housing 24.

Properly spaced and oriented beneath vibrator plate 22 and beneath each other are located a number of additional vibrator plates 26. These plates 26 are arranged and actuated in such a way that the tobacco stream T delivered onto plate 22 is moved by the same horizontally across the predryer housing 24 and then deposited onto the next vibrator plate 26 located beneath plate 22. The tobacco stream T, by the vibrator action of plate 26, is moved again across the predryer housing and fed onto the next vibrator plate therebelow. This conveying of the tobacco stream back and forth within the housing 24 continues until the lowermost plate deposits it onto another endless conveyor belt 28 which carries said tobacco stream out of the predryer 24.

In conveying the tobacco stream through the predryer by means of a series of vibrating plates as illustrated in the drawing, substantially all of the tobacco for some length of time is uniformly exposed to the air within the housing and the drying action is not confined to the top layer of the stream only.

Within the housing 24 are also mounted and located a number of suitably arranged steam pipes (not shown) all of which are connected to a suitable feed pipe 30 and an exhaust pipe 32. The feed pipe 30 is provided with a suitable valve 34 which permits a control of the amount of heat required for drying action within the housing 24.

To the bottom portion of housing 24 is also connected the end of a duct 36 which in turn is connected to a blower 38 employed for the purpose of providing a constant air flow as well as circulation of the air within the housing 24. A suitable vent 40 mounted on the top of housing 24 serves as an exhaust for said air stream.

In order to speed up drying operations within the housing 24, the air stream forced into the same by the blower 38 may be heated by means of a suitable steam coil arrangement surrounding or penetrating a portion of the tube 36. The amount of heat supplied by said steam coil to heat the air stream is regulated by a suitable modulator valve 44 which in turn may be automatically controlled by a thermostat 46 placed within the duct 36.

In order to control the amount of heated air sent into housing 24 the duct is provided with a damper 48. The latter is mounted on a shaft 50 to one end of which is secured a lever 52 which by means of a link 54 is connected to an arm 56 pivotally mounted on a shaft 58. From the hub of arm 56 extends a cam lever 60 which due to the action of a suitable tension spring (not shown) contacts a suitable cam 62 mounted on a shaft 64 of a servomotor 66. The latter is actuated by a servo amplifier unit S the circuit of which will be described hereinafter.

The servo amplifier unit S in turn is connected to the dielectric detector in box D which transmits certain impulses or signals to said servo amplifier. Since the dielectric detector D is employed to measure the amount of moisture in the tobacco by means of its electrodes 12 and 14 before the tobacco enters the predryer, this measurement results in a certain output or voltage which is electronically transmitted to the servo amplifier unit S which in turn through its servo control motor 66 activates the shaft 64 in which the damper control cam 62 is mounted and effects the proper setting of said cam 62.

It is evident, of course, that the setting of the latter also influences and controls the setting of the damper 48 in duct 36. Therefore, if the tobacco passing through the electrodes has a high amount of moisture the dielectric detector reacts accordingly and transmits the corresponding signal to the servo amplifier unit S which then in turn sets the damper control cam 62 in a position which causes the damper 48 to open to the fullest extent, thus permitting a greater volume of heated air to be blown into the predryer housing 24, which increases the drying effect. If the detector D indicates that only a medium amount of moisture is contained in the tobacco, the damper plate 48 would then be set to a half open position and the drying effect upon the tobacco within the housing 24 is accordingly less severe.

As mentioned heretofore, the tobacco stream T, after passing over the various vibrator feed plates in the predryer, is deposited on the endless conveyor 28 which carries said tobacco stream out of the predryer and feeds the same onto another endless belt conveyor 68. The latter carries the tobacco stream into a tobacco drying apparatus, which is of similar construction to the predryer mentioned above and consists of a housing 70 in which are suitably located and actuated a plurality of slightly inclined vibrator feed plates 72 arranged in spaced relation on top of each other in such a manner as to effect a feeding or conveying of the tobacco stream T several times back and forth within the said housing 70 of the dryer in substantially the same manner as in the predryer housing 24 described above.

The endless belt conveyor 68 feeds the tobacco stream into the dryer housing 70 and deposits the same onto the uppermost vibrator feed plate 72 which in turn conveys it onto the next lower plate and so on until the tobacco stream reaches the lowermost plate which deposits the same onto an endless conveyor belt 74 which carries the tobacco out of the dryer housing 70. As the tobacco is deposited by one vibrator feed plate 72 onto the next lower plate as shown in Fig. 1 the top layer of the stream will go to the bottom and the bottom layer will come to the top and so on as the stream drops from plate to plate, so that every part or portion of the entire stream while being conveyed through the dryer will come into contact with the heated and/or humidified air within said dryer. Said air is forced in and through the dryer housing 70 by means of a blower 76 which is connected to the bottom of said housing by means of a duct 78. Since the purpose of the dryer is to control the moisture content of tobacco going through the dryer, a portion of the duct 78 is surrounded by conveniently arranged steam coils 80 which heat the air blown into the duct by the blower to 150° F. or any other suitable temperature. The temperature is controlled through a temperature measuring device 82 such as a thermometer or thermostat arrangement working in conjunction with a conventional automatic temperature control device 84 which in turn activates and controls the setting of a valve 86 employed for the purpose of checking the steam supply for the steam coil arrangement 80.

The heating process lowers the relative humidity of the air circulated by blower 76 to as low as 30 percent at 150° F. As 30 percent humidity is undesirably low, additional means are provided for correcting and controlling the relative humidity. After the air has been driven through the steam coil portion of the duct it will pass through a section in the duct 78 where steam will be sprayed into the air by means of a steam humidifier 88 to bring the relative humidity up to the desired 50 percent or any other fixed relative humidity. The relative humidity is controlled through a hygrometer or humidistat 89 working in conjunction with a conventional automatic relative humidifier control device 90 which in turn activates and determines the setting of a steam humidifier control valve 92. Manual control of the temperature as well as the humidifying control may be performed by an operator who may regulate the two control valves 86 and 92, by setting the controls 84 and 90.

By watching a suitably placed thermometer 94 and manipulating control 84, the operator may regulate the input steam to the steam coils 80 and effect a raising or lowering of the air temperature as desired. By observing a suitably situated hygrometer 96 and manipulating control 90 the operator may regulate the steam input by the humidifier 88 into the duct 78 itself and bring the relative humidity to the desired percentage.

The processed tobacco stream carried out of the dryer housing 70, by means of the conveyor 74, is then deposited by the latter onto another endless belt conveyor 100 which carries said stream through a shielded housing 102. The housing 102 encloses a pair of electrodes 104 and 106 and a suitable continuous weighing device which may be either mechanical, electronic, or pneumatic such as that sold under the trademark "Conveyoflo." This device consists of a plurality of rollers 108 attached to and supported by electronically operated weighing devices 110, the rollers supporting a portion of the tobacco carrying conveyor belt 100. The "Conveyoflo" device is well known in the art and employed for the purpose of determining and registering the weight of material conveyed through this device at a predetermined speed.

The electronically operated weighing devices 110 by means of a cable 112 are connected to a weight indicator 114 which in turn is connected to a suitable weight counter 116 which will register the cumulative weight over a desired period of time. The weight indicator 114 as well as the counter 116 are situated in a control box 118 which contains also a dielectric detector which by means of two shielded cables 120 and 122 is connected to the two electrodes 104 and 106 respectively.

The dielectric detector in box 118 is of the same type as the one enclosed in box D and is used for the purpose of detecting the total moisture pounds per hour which registers on a dial 124 of control box 118. Since the "Conveyoflo" measures the total weight continuously and the dielectric detector simultaneously measures the total moisture continuously of the same material, a computing circuit connected with these two determines the percent of moisture with respect to total weight and registers same on a dial 126 of control box 118.

It will be understood that while the dielectric electrodes 104 and 106 and the "Conveyoflo" have been shown to make simultaneous measurements on the tobacco stream, the dielectric detector and the "Conveyoflo" could be displaced longitudinally with respect to each other along the stream, so that they make their measurements at different times. In this case it would be necessary to employ a suitable synchronization means. Any of the well known means which is adapted to delay a signal for a given period of time and then feed the delayed signal in time sequence with another selected signal may be used as a synchronizer. A commonly used time delay system is one which magnetically records the signal to be delayed onto an endless loop of recording tape, and then picks up the signal for retransmission at a second position on the tape. Such a recording system is shown in Magnetic Recording by S. J. Begun, page 183, copyrighted 1949. This system is employed in the arrangement of Figs. 6 and 7 in order to delay the weight signal from the "Conveyoflo" so that it may be fed to the control box 118 in time coincidence with the signal received from dielectric detector elements 104', 106'. In Fig. 6 cables 120', 122' from dielectric detector plates 104', 106', respectively, are connected to a suitable electrical synchronizer 123 shown in more detail in Fig. 7. Also connected to synchronizer 123 is cable 112' connected to the output of "Conveyoflo"

weigher 108'. Synchronizer 123 delays information received from the weighing of increments of tobacco passing over weigher 108' until the same increments are sensed for moisture content by the dielectric detector electrodes 104', 106'. The dielectric detector signal and the delayed weight signal are then fed to control box 118 by means of cable 125 connected thereto. Control box 118 performs the same functions in the same manner as described above. However, if desired, the dielectric detector D may be mounted in synchronizer box 123 as shown in Fig. 7. In Fig. 7 the magnetic type of delay mechanism for providing the synchronizing function and described in general terms above is shown. Magnetic tape 128 is formed into an endless loop arrangement and driven by means of drive cable 130 which is connected to the drive for conveyor belt 100. Signals representative of variations in the weight of the tobacco passing across the weighing elements of "Conveyoflo" weigher 108' are fed to a recording head 132 where the signal to be delayed is applied to magnetic tape 128. The applied signal is then picked up by a magnetic play back head 134 and fed in the usual manner through cable 125 to control box 118. An erase head 136 is suitably positioned in order to erase the weight information after it has been picked up by play back head 134. Recording head 132 and play back head 134 are so positioned with respect to tape 128 that the delay transpiring between recording of the information and its playback is equal to the delay occurring between weighing of increments of tobacco by "Conveyoflo" belt 108' and sensing of the same increment by dielectric detector electrodes 104', 106'. Of course, it is understood that endless magnetic tape may be driven through suitable gears or pulleys in order to properly adjust the desired time delay. Dielectric detector D is also shown in Fig. 7 as being mounted in synchronizer box 123. Accordingly electrode leads 120', 122' from electrodes 104', 106, respectively, are connected to dielectric detector D and the output thereof is fed through cable 125 to control box 118. Although one of the simplest forms of electrical delay systems is shown, any of the other well known delay systems may be used. For example, it is obvious to one skilled in the art that the capacitor belt system shown in U. S. Patent No. 2,506,149, issued May 2, 1950 to Gerhard Herzog, may be employed instead of the magnetic type delay system as shown in Fig. 4 of the Herzog patent. It is further obvious that the electro-mechanical vibrating rod type delay system shown in U. S. Patent No. 2,284,345, issued May 26, 1942 to C. H. Schlesman, may be used if desired.

As mentioned above, the automatic controls 84 and 90 maintain the temperature and humidity at predetermined settings. Should it become necessary to vary these predetermined settings because the tobacco coming out of the dryer is either too dry or too moist, the tobacco stream when passing over the "Conveyoflo" and through the electrodes 104 and 106 operates the control in box 118 to effect an automatic change of these predetermined settings. For this reason the dielectric detector in box 118 as well as the moisture percentage indicator is connected to a servo amplifier in box 118 which when sensing an "error" signals from these two circuits effects a balancing of the circuit.

The servo amplifier in box 118, the circuit of which is shown in Fig. 4, is connected to another servo amplifier 130 the circuit of which is shown in Fig. 5. Therefore, any "error" signal transmitted to the amplifier in box 118 also affects the amplifier 130 which in turn causes a resetting of the "fixed point settings" of either the temperature control 84 or the relative humidity control 90 or both from the previous fixed position to another fixed position and thus adjusts the percentage of moisture to the correct value. It will be appreciated, of course, that these adjustments could also be made manually if desired and the "error" signal could either be made to actuate a light or ring a bell to indicate to the operator that a manual adjustment should be made.

The two dielectric detectors in the boxes 15 and 118 (Fig. 1) respectively are identical and may be similar to that described in U. S. patent application Serial No. 148,662, referred to above, and both consist of the same circuit as the one illustrated in Fig. 2 which is constructed as follows.

High frequency power is derived from an oscillator tube 200 which is a double triode, connected in a conventional push-pull oscillator circuit, tuned to a frequency of 100 megacycles. The main oscillator M. O. is completely shielded to prevent interaction between it and other parts of the circuit. All components are rigidly fixed to increase stability. The oscillator has a tank coil 202 and a tank capacitor 204. Positive direct voltage is supplied to the center tap of coil 202. Condensers 206 are radio frequency by-pass condensers.

Grid resistors 203 are connected to their respective grids of tube 200. Capacitors 201 are connected between the grid of one section and the plate of the other section of the double triode. Cathode resistor 207 aids in providing equal division of current between the two halves of double triode 200. Condensers 209 and radio frequency choke 211 serve to eliminate radio frequency from the filament wiring. Coil 208 which has a grounded center tap is inductively coupled to coil 202. The two halves of coil 208 also constitute two adjacent arms of a bridge circuit. Electrodes 12 and 14 and coaxial cables 16 and 18 respectively form the third arm. The fourth arm consists of a balancing network containing differential condenser 212, variable condenser 214, and fixed resistor 216. Resistor 216 is connected in series with stator 218 of differential condenser 212, and the other end of this resistor 216 is connected to stator 220 of differential condenser 212 as well as to one side of coil 208.

When rotor 222 of condenser 212 is adjusted for more capacity to stator 220, the fourth arm consists essentially of this capacity in series with condenser 214. Resistor 216 being in series with the minimum capacity between rotor 222 and stator 218, and both of these being in parallel with the maximum capacity between rotor 222 and stator 220 causes only a very small phase shift in this fourth arm. When, on the other hand, rotor 220 of condenser 212 is adjusted for maximum capacity to stator 218, the fourth arm consists essentially of resistor 216 in series with this maximum capacity and with condenser 214, while only the minimum capacity between rotor 222 and stator 220 is shunted across capacity between rotor and stator 222 to 218 and resistor 216. We then have maximum phase shift. This circuit results in a very large range of adjustment of phase and capacity in the fourth arm without the use of variable resistors or excessively large adjustable condensers.

Cables 210 are made so that the effective length of each is exactly equal to ½ wave length or integral multiples thereof. The effective electrical length of a cable is readily determined by one skilled in the art and depends on various factors such as the insulating material in the cable, the geometry of the conductor, the manner in which the ends of the cable is terminated, and the frequency of the energy transmitted by the cable. The effective electrical length of a cable is usually expressed in wave lengths (or fractions thereof) of the energy transmitted by the cable. Thus, if the voltages at two spaced points of the cable are in phase, the distance between these points is said to be one wave length (or a multiple thereof). If these voltages are 180° out of phase, their distance is said to be ½ wave length (or 1½ or 2½, etc.). Thus, they are the equivalent of very low resistors, and have practically no effect on the balance of the bridge.

The capacity from the upper electrode 12 to ground is effectively connected across one-half of coil 208. Coil 208 is of relatively low impedance, so that the small capacity from electrode 12 to ground is not sufficient to resonate with coil 208. The capacity from electrode 14 to ground is across the diagonal of the bridge and therefore has little affect on its balance. Both capacities of electrode 12 and 14 to ground are held low to further reduce any effect of changes in these capacities on the balance of the bridge.

The output of the bridge is taken from junction point 221 and is inductively coupled to coil 226 through coil 224. A local oscillator voltage is capacitively coupled to wire 225 by means of the capacitive effect between the wire 225 and coil 230. Oscillator coil 230 is the tank coil for a conventional "Hartley" oscillator consisting of capacitors 234 and 236, and 231, and grid resistor 238. The local oscillator voltage is such that it is much greater than the signal voltage received from the output of the bridge circuit through coil 226. As a result changes in the local oscillator voltage have little effect on the signal.

The main oscillator and local oscillator frequencies pass through capacitor 235 to the grid of the mixer section of tube 228, which is a conventional circuit for converting a high frequency to a lower frequency. Resistor 237 serves as the grid return and the cathode is returned to ground through capacitor 227 and resistor 229. The difference frequency between the main oscillator and local oscillator frequencies appears at the plate of the mixer across coil 240, which is permeability-tuned to the difference frequency. The voltage of this difference frequency is substantially proportional to the output voltage of the bridge circuit.

This voltage is then amplified in a three stage intermediate frequency amplifier, containing cathode degeneration for stability. Amplification occurs with tubes 244, 246 and 248. These tubes and their circuits are of conventional design. Components consist of coupling condensers 249, 254, 266, and 280; permeability-tuned output coils 240, 253, and 265; cathode resistors 242, 255, 269, grid resistors 243, 257, and 267. Condensers 247, 264, and 270 are radio frequency by-pass condensers for the filament circuit. Resistors 245 and 259 return the grids of tubes 244 and 246 to a positive direct voltage. Resistors 251, 261, 268, 273, 275, 277 and their associated by-pass condensers 241, 262, 263, 272, 274, and 276 and 278 form a voltage divider network for supplying positive D. C. voltage to the plates and screen grids of pentode tubes 244, 246, and 248, and positive D. C. voltage to the control grids of 244 and 246.

The signal appearing at resistor 271 is the amplified signal and is the difference between the frequency fed into the coil 226 from the bridge circuit H which derives its voltage from the main oscillator through coil 208, and the local oscillator frequency developed in the mixer tube 228 and mixed with the main oscillator frequency in the mixer section of tube 228. This three stage intermediate frequency amplifier is stagger-tuned to provide constant output regardless of small changes in main oscillator frequency, as is well known in the art. It will be understood that the main oscillator and/or the local oscillator could be crystal controlled to provide close control over frequency.

The signal across resistor 271 is fed to the half-wave voltage doubler rectifier tube 250 through coupling capacitor 280. Tube 250 provides more gain through its voltage doubling action, and in addition rectifies the signal, thus removing the intermediate frequency. Condensers 284, 285, and 286 are radio frequency by-pass condensers. Coil 281 is permeability-tuned to the intermediate frequency. Condensers 283 and 287 form part of the voltage doubling circuit. Choke 288 is a radio frequency choke. Meter MA is a milliammeter, and it and resistor 290 form the load for the output of the voltage-doubler rectifier, with polarity as shown. Condenser 289 is a by-pass condenser.

The rectified signal developed across meter MA and resistor 290 is fed to grid of cathode follower 260 through resistor 293. The cathode of cathode follower 260 is connected to cathode resistor 297 and also through an indicator 17 to a connector plug 299. The resistor 297 is returned to negative or ground.

For biasing the grid of cathode follower 260 a potentiometer 752 is provided which together with resistors 294 and 296 determine the bias voltage range. The intermediate frequency signal is also fed to tube 252, which is a triode combined with an electron ray indicator. It is biased to zero shadow angle by adjusting resistor 292. The triode plate resistor 256 is by-passed by 258. Thus, the triode acts as a biased detector, in the manner disclosed in the U. S. Patent 2,340,914 granted to Uncas A. Whitaker on February 8, 1944.

The power supply PS provides all filament voltages and both positive and negative D. C. voltages. Voltage regulator tubes are used to maintain constant direct current voltages. To maintain the entire system at a constant operating voltage a constant voltage transformer (not shown) may be added to the input of the power transformer.

The output of the detector tube 250 is indicated on the meter MA which is a visual indicator. This output is also fed to cathode follower 260 for providing a low impedance output at its cathode for operating the servo amplifier S which is connected with this dielectric detector circuit by means of contact of its connector plug 299a (Fig. 3) with the connector plug 299 (Fig. 2) of the dielectric detector circuit.

In operation the cutter C delivers a steady stream of a predetermined quantity of tobacco to the conveyor belt 10 (Fig. 1) which runs at a constant predetermined speed. While the stream of tobacco T passes between the electrodes 12 and 14 (Figs. 1 and 2) the phase and capacity controls, 212 and 214 (Fig. 2) are adjusted until the meter MA shows that the bridge is balanced for an average moisture content of the tobacco.

This balance condition is shown by the fact that the pointer of meter MA fluctuates around the zero reading, and by the fact that the shadow angle fluctuation of electron-ray indicator 252 is at a minimum. This is especially advantageous because the bridge is balanced under actual operating conditions when the tobacco stream is in the process of conditioning and manufacturing.

Once the balance condition is established, it is necessary to unbalance the bridge a fixed amount so that it will discriminate between too dry and too wet tobacco. For example, after balance is attained, if capacity 214 is decreased, then the bridge becomes unbalanced and the meter MA will read at some value greater than zero. Since the capacity 214 has been decreased from the setting obtained for the average moisture content of tobacco then a tobacco with less moisture content than average will cause the meter MA to approach zero, or a tobacco with more moisture than average will cause the meter to deviate even further from the unbalanced condition.

The polarity in this case turns out to be positive for dry tobacco and negative for wet tobacco. It is not necessary that this be so arranged and is dependent upon the connections to the voltage doubler rectifier tube 250. It will be understood that these connections are arbitrary and might just as well have been chosen in the opposite sense, so that a dry tobacco would produce a negative signal and a wet tobacco produce a positive signal. However, for purposes of standardizing, the connections have been made as described above so that a dry tobacco produces a positive signal and a wet tobacco produces a negative signal.

It is to be understood that the bridge may be unbalanced to its operating point if the phase control 212 is changed from the setting obtained for a moisture content of the tobacco while the capacity control remains unchanged. What has been said concerning the unbalancing of the bridge by changing capacity 214 to bring the bridge to its operating point, would also be applicable in this case.

Figure 2:
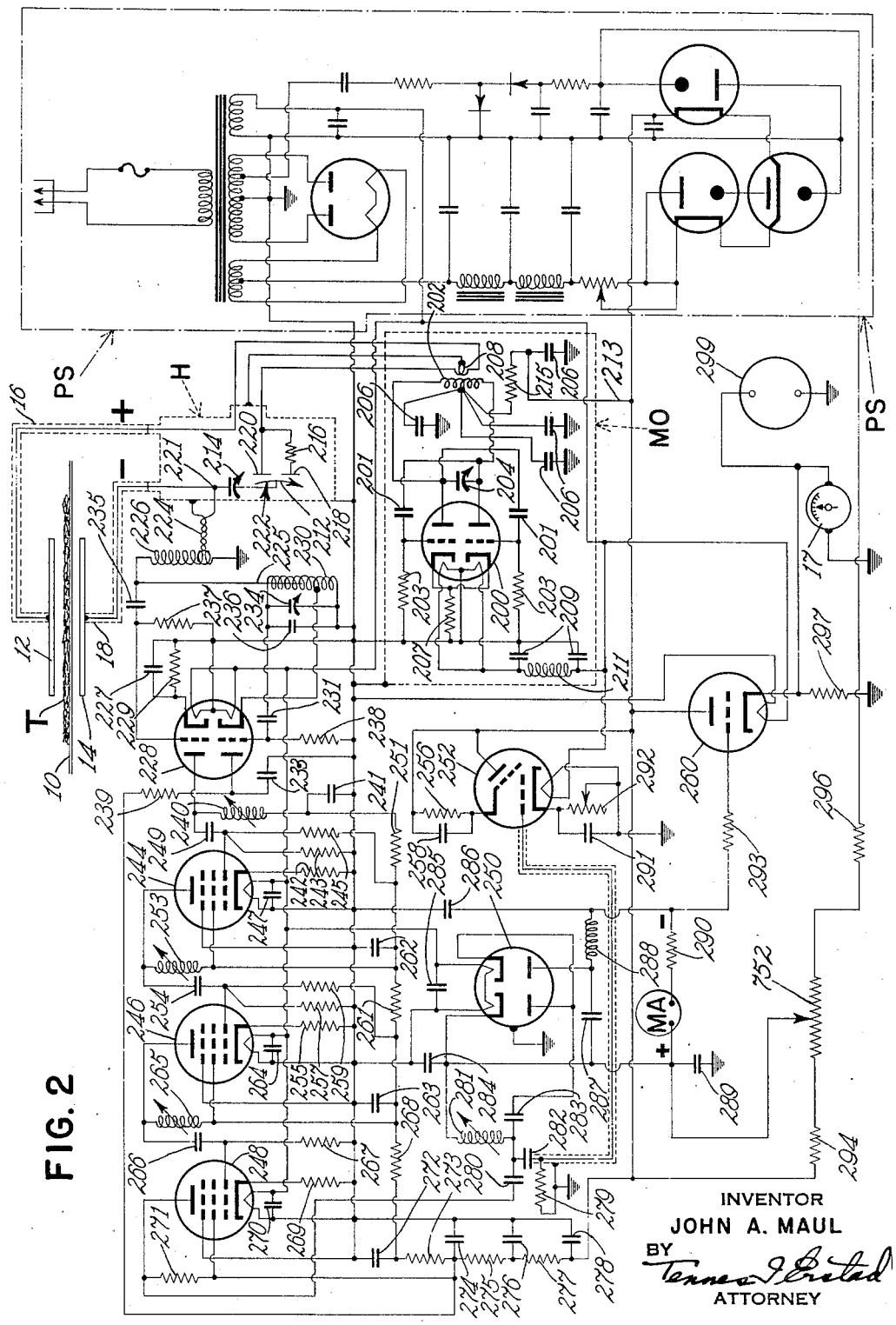
Fig. 2 is a diagram of a dielectric detector circuit.

As mentioned heretofore the dielectric detector circuit shown in Fig. 2 is by means of the connector plug 299 connected to the connector plug 299a of the servo amplifier in box S the circuit of which is illustrated in Fig. 3. Therefore any change of voltage created in the dielectric detector is transmitted from the same through the plugs 299 and 299a to the servo amplifier circuit (Fig. 3). The varying voltage thus received by the latter is integrated by resistors 300 and 302 and condensors 304 and 306.

A slowly varying D. C. voltage free of transient peak, is developed by the integrating circuit across the grid-to-ground return resistor 308 of one-half of twin triode tube 310. The anodes of twin triodes 310 are connected to the primary winding of center tapped transformer 312. A source of A. C. voltage, which may be of any suitable frequency, for example 60 or 400 cycles per second, is connected between the center tap of the primary winding of transformer 312 and ground.

Twin triode 310, the center tapped primary winding of transformer 312 and cathode resistor 338, comprise a conventional A. C. electronic bridge circuit. A bias voltage, obtained from a suitable D. C. source through potentiometers 332 and 328, and applied across grid-to-ground resistor 330, is adjusted manually in magnitude by means of movable arm 334, of potentiometer 332, in order to reset the bridge circuit in balance with the integrated voltage developed across grid resistor 308.

Any change in magnitude of the integrated voltage will unbalance the bridge causing a flow of current through transformer 312. This unbalance, depending on the magnitude and direction of the change in the integrated voltage, causes either tetrode tube 314 or 316 to conduct more, causing an unbalance in transformer 318 which allows current to flow in the control winding 320 of a two-phase servomotor 66 causing a turning of the same.

A suitable flexible shaft 64 extending from servomotor 66 is geared to an arm 326 of a potentiometer 328 and drives said arm in a direction so as to place a voltage across resistor 330 equal to a voltage across the grid resistor 308. Since the arm 334 of the potentiometer 332 was set manually by means of a knob 336 to a fixed point or value, the arm 326 on motor shaft 64 is driven to a point on the potentiometer which is equal in voltage to that transmitted by the dielectric detector. When this occurs the circuit is again in balance and the servomotor 66 stops. Resistor 338 is the cathode bias resistor for both halves of the twin triode tube 310 and resistor 342 is the cathode bias resistor for the two tetrode tubes 314 and 316.

Resistor 340 is a series resistor of resistance high enough to prevent loading of the grid circuit of the lower half of said twin triode tube 310 by the comparatively low impedances of potentiometers 332 and 326.

As mentioned heretofore in the description of the apparatus shown in Fig. 1 on shaft 64 of servomotor 66 is also mounted the damper control cam 62 which through arms 60 and 56, link 54 and arm 52 activates and controls the setting of the damper 48 in duct 36. Therefore any turning of shaft 64 of servomotor 66 effected in the manner described when the tobacco passing through electrodes 12 and 14 is either too dry or too wet causes the damper 48 and duct 36 either to close or to open, thus controlling the amount of hot air blown through the predryer housing 24.

If the tobacco is too dry the damper assumes a setting which permits only a small quantity of hot air to reach the housing 24 and if the tobacco is too wet the damper opens more fully and a greater quantity of hot air is permitted to pass into said housing. Therefore, upon leaving the predryer housing 24 after being subjected to the drying effects within the same, the moisture content of the tobacco is within a predetermined range.

As mentioned heretofore the tobacco stream then enters and passes through the dryer housing 70 where the tobacco is again subjected to the drying and/or humidifying effect of an air stream so that upon leaving said housing the tobacco will have had the correct amount of moisture added or removed so that the tobacco will be in proper condition for manufacturing. In order to check and automatically adjust the temperature as well as the relative humidity control which governs the heat and humidity in the dryer housing 70 so as to assure a uniform product, the tobacco stream after leaving housing 70 is guided through the housing 102 which contains a pair of electrodes 104 and 106 and the pneumatic weighing devices 110 of the "Conveyoflo."

The latter by means of a cable 112 is connected to a circuit (not shown) which is part of the "Conveyoflo" system and which is provided with a weight indicator 114 all mounted is control box 118. The electrodes 104 and 106 by means of shielded cables 120 and 122 are connected to a dielectric detector circuit which is identical with the one shown in Fig. 2 and described heretofore. To this second dielectric detector by means of a plug 299b engaging with plug 299 of said detector, is connected a servo amplifier also mounted in control box 118 and consisting of a circuit such as illustrated in Fig. 4.

As mentioned heretofore the weight of the tobacco is measured by the "Conveyoflo" system and the total moisture is measured by the dielectric detector. The meter 114 of the "Conveyoflo" system is so arranged as to mechanically drive an arm 400 of a potentiometer 402 (Fig. 4) of the servo amplifier, picking off a voltage proportional to the total weight of the tobacco as measured by the "Conveyoflo" system. This voltage is applied across a potentiometer 404 (Fig. 4).

The servo amplifier shown in Fig. 4 is similar to the one illustrated in Fig. 3 and has a similar servomotor 406. A suitable flexible shaft 408 connects the motor 406 to an arm 410 of the potentiometer 404. The voltage output of the dielectric detector transmitted to and amplified by the circuit shown in Fig. 4 in effect drives the servomotor 406 and through shaft 408 turns the arm 410 to a point on the potentiometer 404 which is equal in voltage to that transmitted by the dielectric detector in control box 118.

The rotation of shafts 400 and 410 of potentiometers 402 and 404 respectively, which are connected in series, develops a voltage equal to the product of the voltages developed by the rotations of each individual shaft.

The voltage appearing between points A and B is proportional to the ratio of water to the total weight of tobacco as appears between points B and C, and is read as percent moisture content by meter 126 connected between points A and B. Either the proportion of voltage or the mechanical position of the servomotor shaft 408 which drives the arm 410 of potentiometer 404 can be used as a control of a tobacco drying process.

The servo amplifier circuit shown in Fig. 4 functions as follows. The potentiometers 402 and 404 perform in the manner described above. A change in voltage is transmitted from the dielectric detector through the connector plugs 299 and 299b to the servo amplifier. This varying voltage is integrated by the resistors 412 and 414 and condensers 416 and 418.

A slowly varying D. C. voltage free of transient peaks is developed by the integrating circuit across the grid-to-ground return resistor 420 of one-half grid triode tube 422. The anodes of twin triodes 422 are connected to the primary winding center tapped transformer 424.

A source of A. C. voltage which may be of any suitable frequency, for example 60 or 400 cycles per second, is connected between the center tap of the primary winding of transformer 424 and ground.

Twin triode tube 422, the center tapped primary winding of transformer 424 and cathode resistor 436 comprise a conventional A. C. electronic bridge circuit. A bias voltage obtained from a suitable D. C. source through potentiometers 402 and 404, and applied across grid-to-ground resistor 434, is adjusted in magnitude by means of movable arms 400 and 410 of potentiometers 402 and 404 respectively in order to set the bridge circuit in balance with the integrated voltage developed across grid resistor 420.

Any change in magnitude of the integrated voltage will unbalance the bridge causing a flow of current through transformer 424. This unbalance, depending on the magnitude and direction of the change of the integrated voltage cause either tetrode tube 426 or 428 to conduct more, causing an unbalance in the transformer 430 which allows current to flow in the control winding 432 of the two phase servomotor 406.

The flexible shaft 408 of the latter is geared to the arm 410 of the potentiometer 404 and drives it in a direction so as to place a voltage across resistor 434 equal to the voltage across resistor 420. When this occurs the circuit is again in balance and the servomotor stops. The resistor 436 is the cathode bias resistor for both halves of the twin triode tube 422 and resistor 438 is the cathode bias resistor for the two tetrode tubes 426 and 428.

Resistor 440 is a series resistor of resistance high enough to prevent loading of the grid circuit of the lower half of the twin triode tube 422 by the potentiometer 404 by the comparatively low impedance of potentiometers 402 and 404.

To the shaft 408 of servomotor 406 is geared another arm 442 (Fig. 4) of a potentiometer 444 and the voltage across the latter and said arm 442 is led to a connector plug 446 which is in contact with a plug 446a (Fig. 5) of the servo amplifier 130 which is employed to effect the resetting of the relative humidity control 90 and/or the temperature control 84 when a signal from the dielectric detector in control box 118 indicates that there is too much or too little moisture in the processed tobacco stream when passing over the "Conveyoflo" and through the electrodes 104 and 106. A voltmeter 124 is connected across the terminals of plug 446 to indicate the total moisture content, since the voltage measured thereby is representative of moisture content.

As described heretofore, any change of voltage created in the dielectric detector causes, through servomotor 406 and shaft 408 (Fig. 4), a movement of the arm 442 of the potentiometer 444. This effects a varying voltage across the latter which in turn, through plugs 446 and 446a, is transmitted to the servo amplifier 130 the circuit of which is illustrated in Fig. 5. This varying voltage received by the latter is integrated by resistors 500 and 502 and by the condensers 504 and 506.

A slowly varying D. C. voltage free of transient peaks, is developed by the integrating circuit across the grid-to-ground return resistor 508 of one-half of twin triode tube 510. The anodes of twin triodes 510 are connected to the primary winding of center tapped transformer 512. A source of A. C. voltage, which may be of any suitable frequency, for example 60 or 400 cycles per second, is connected between the center tap of the primary winding of transformer 512 and ground.

Twin triode 510, the center tapped primary winding of transformer 512 and cathode resistor 538 comprise a conventional A. C. electronic bridge circuit. A bias voltage obtained from a suitable D. C. source through potentiometers 534 and 528, and applied across grid-to-ground resistor 530, is adjusted manually in magnitude by means of movable arm 532, of potentiometer 534, in order to reset the bridge circuit in balance with the integrated voltage developed across grid resistor 508.

Any change in magnitude of the integrated voltage will unbalance the bridge causing a flow of current through transformer 512. This unbalance, depending on the magnitude and direction of the change in the integrated voltage, causes either tetrode tube 514 or 516 to conduct more, causing an unbalance in transformer 518 which allows current to flow in the control winding 520 of a two phase servomotor 522 and causes the same to turn.

A suitable flexible shaft 524 extending from servomotor 522, is geared to an arm 526 of a potentiometer 528 and drives said arm in a direction so as to place a voltage across resistor 530 which is equal to a voltage across the grid resistor 508. Since an arm 532 of a potentiometer 534 was set manually by means of a knob 536 to a fixed point or value, the arm 526 on servomotor shaft 524 is driven to a point on the potentiometer 528 which is equal in voltage to that transmitted by the dielectric detector.

The shaft 524 of the servomotor 522 also extends into and is geared to the relative humidity control 90 where any turning of said shaft will effect a resetting of the automatic controls of this device. Shaft 524 may also be extended to the temperature control 84 (Fig. 1) where a resetting of the automatic temperature controls can be effected in the same manner.

The resistor 538 in the servo amplifier 130 (Fig. 5) is the bias resistor for both halves of the twin triode tube 510 and resistor 542 is the bias resistor for the two tetrode tubes 514 and 516. Resistor 540 is a series resistor of resistance high enough to prevent loading of the grid circuit of the lower half of said triode tube 510 by the comparatively low impedance of the potentiometers 534 and 528.

The twin triode tubes 310, 422 and 510 shown in Figs. 3, 4, and 5 respectively may be of the type known as 12AU7 and the tetrode tubes shown in the corresponding amplifiers may be of the type known as 6AQ5.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. The method of arriving at the percentage of the moisture in a tobacco stream which comprises the steps of, detecting the dielectric properties of the tobacco stream by a dielectric detector, simultaneously weighing said tobacco stream by an automatic weigher, automatically comparing the signal generated by said dielectric detector with the signal generated by said automatic weigher to give a ratio of the dielectric detector signal to that of the weigher signal so as to indicate the percentage of moisture in this tobacco.

2. Apparatus for controlling the moisture content of material capable of being conveyed in a continuous stream, comprising, means for conveying said material through said apparatus, a conditioning chamber through which said conveying means passes, a humidifier connected to said conditioning chamber for increasing the humidity in said chamber, a drier connected to said chamber for decreasing the moisture content of material passing through said chamber, a dielectric detector positioned adjacent to said chamber to detect the dielectric properties of successive increments of the material supported on said conveying means as it leaves the chamber, a continuous weighing device positioned adjacent to said dielectric detector for continuously weighing successive increments of the material supported on said conveying means, electrical signals generated by said dielectric detector and said continuous weighing device, means for synchronizing said signals so that each is representative of the same increment of material, comparision means for comparing the dielectric signal to the weighing signal to indicate the percentage of moisture in the material, and a servo controlled by said comparison means for actuating said humidifier and drier in response to variations in the percent of moisture content of the material to bring the moisture content of said material within predetermined limits when it passes through said chamber.

3. The method of measuring percent of moisture of a continuously moving stream of moisture-containing material which comprises translating the weight of an increment of said material into a first electrical signal, translating variations in the dielectric properties of said increment of material into a second electrical signal representative of the variations in the moisture content of said material, and then automatically comparing said first signal with said second signal to determine the percent of moisture in the material.

4. Apparatus for determining the percentage of moisture in material comprising a continuous weighing scale for determining the total weight of moving material, said scale including means for generating a first electrical signal representative of said weight, a conveyor for moving material over said weighing scale, a dielectric detector for determining the quantity of moisture in said material as it passes over said scale, said detector having means for generating a second electrical signal representative of said detected quantity of moisture and automatic means for comparing said first signal with said second signal to indicate automatically the percentage of moisture in the material.

5. Apparatus for conditioning tobacco as it moves along a predetermined path of travel comprising a continuous source of tobacco to be conditioned, a dielectric detector positioned adjacent the path of travel of said tobacco for ascertaining the amount of moisture in said tobacco as it is conveyed along said predetermined path of travel, a drier for receiving said tobacco, a heat source associated with said drier for lowering the moisture content of said tobacco to a predetermined amount, and means actuated by said dielectric detector for controlling the operation of said heat source so as to control the amount of moisture removed from said tobacco, a conditioning chamber for receiving tobacco from said first drier, a second heat source associated with said conditioning chamber for drying said tobacco in said conditioning chamber, a humidifier associated with said second heat source for adding moisture to the tobacco passing through said conditioning chamber, a second dielectric detector for measuring the amount of moisture in the tobacco discharged from said conditioning chamber, an automatic weighing device for simultaneously weighing said tobacco as it is discharged from said conditioning chamber to ascertain the total weight of said conditioned tobacco, and a control device actuated by said weighing and detecting devices to automatically determine the percent of moisture in the tobacco discharged from said conditioning chamber.

6. Apparatus for conditioning tobacco as it moves along a predetermined path of travel comprising a continuous source of tobacco to be conditioned, a dielectric detector positioned adjacent the path of travel of said tobacco for ascertaining the amount of moisture in said tobacco as it is conveyed along said predetermined path of travel, a drier for receiving said tobacco, a heat source associated with said drier for lowering the moisture content of said tobacco to a predetermined amount, and means actuated by said dielectric detector for controlling the operation of said heat source so as to control the amount of moisture removed from said tobacco, a conditioning chamber for receiving tobacco from said first drier, a second heat source associated with said conditioning chamber for drying said tobacco in said conditioning chamber, a humidifier associated with said second heat source for adding moisture to the tobacco passing through said conditioning chamber, a second dielectric detector for measuring the amount of moisture in the tobacco discharged from said conditioning chamber, an automatic weighing device for simultaneously weighing said tobacco as it is discharged from said conditioning chamber to ascertain the total weight of said conditioned tobacco, and a control device actuated by said weighing and detecting devices to automatically determine the percent of moisture in the tobacco discharged from said conditioning chamber, said control device including means for regulating said second heat source and said humidifier to control the moisture content of said tobacco.

7. The method of conditioning tobacco moving along a path of travel in a continuous stream comprising the steps of measuring variations in the dielectric properties of successive increments of said tobacco stream to obtain measurements representative of the changing moisture content thereof, adjusting the moisture content of said tobacco stream to a predetermined norm with a conditioner when said measured moisture variations exceed a predetermined limit, further adjusting the moisture content of said stream in a humidifier, measuring the dielectric properties of said tobacco increments after the moisture content thereof has been further adjusted, simultaneously measuring the weight of said tobacco increments while making said second dielectric measurements, correlating said weight measurements with said second dielectric measurements to obtain the percentage of moisture content of said tobacco, and continuously re-adjusting said humidifier to obtain a predetermined percentage of moisture in said stream of tobacco.

8. Apparatus for conditioning tobacco comprising a dielectric detector for detecting the amount of moisture in a moving stream of tobacco, a conditioning chamber for varying the amount of moisture in said tobacco stream in accordance with the detections made by said dielectric detector to bring the amount of moisture within predetermined limits, means for passing said tobacco stream through a second conditioner, means for maintaining the moisture content of said tobacco stream within predetermined limits, a second dielectric detector and a continuous weighing device for simultaneously acting on the tobacco as it leaves said conditioner to simultaneously determine its moisture content and weight, and computing means for computing a ratio between said moisture content and weight to indicate the percentage of moisture in the material, the output of said computing means being connected to said conditioner, whereby said conditioner is actuated in response to variations in the percent of moisture content of said tobacco.

9. Apparatus for indicating the percentage of moisture in material being conveyed in a continuous stream comprising a conveyor, a dielectric detector positioned adjacent to said conveyor for generating a signal representative of the dielectric properties of successive increments of said material being conveyed, means for automatically weighing successive increments of said material and converting said weight to a signal, means for synchronizing said signals so that each signal corresponds to measurements of the same increment of material, and means for computing a ratio between the signal generated by said dielectric detector and the signal generated by said weigher to indicate the percentage of moisture in the tobacco.

10. Apparatus for controlling the moisture content of material capable of being conveyed in a continuous stream, comprising means for conveying said material through said apparatus, a conditioning chamber through which said conveying means passes, a humidifier connected to said conditioning chamber for increasing the humidity in said chamber, a drier connected to said chamber for decreasing the moisture content of material passing through said chamber, a dielectric detector positioned adjacent to said chamber to detect the dielectric properties of successive increments of the material supported on said conveying means as it leaves the chamber, a continuous weighing device positioned adjacent to said dielectric detector for continuously weighing successive increments of the material supported on said conveying means, electrical signals generated by said dielectric detector and said continuous weighing device, means for synchronizing said signals so that each is representative of the same increments of material, and computing means for computing a ratio between the magnitude of the dielectric detector signal and the weighing signal to indicate the percentage of moisture in the material, and means connected to said computing means and said drier and said humidifier for adjusting the moisture content of said material in response to variations of said moisture percentage beyond predetermined limits.

References Cited in the file of this patent

UNITED STATES PATENTS

| | | |
|---|---|---|
| 1,567,031 | Buensod | Dec. 29, 1925 |
| 1,976,487 | Elberty | Oct. 9, 1934 |
| 2,373,846 | Olken | Apr. 17, 1945 |
| 2,497,703 | Todd | Feb. 14, 1950 |
| 2,508,045 | Seney | May 16, 1950 |
| 2,535,026 | Anderson | Dec. 26, 1950 |
| 2,607,830 | Razek | Aug. 19, 1952 |

FOREIGN PATENTS

| | | |
|---|---|---|
| 417,493 | Great Britain | Feb. 7, 1949 |